United States Patent
Fischer

(10) Patent No.: US 7,900,422 B2
(45) Date of Patent: Mar. 8, 2011

(54) DEVICE AND METHOD FOR THE PRODUCTION OF PLASTIC CONTAINERS

(75) Inventor: Sven Fischer, Obertraubling (DE)

(73) Assignee: Krones AG (DE)

( * ) Notice: Subject to any disclaimer, the term of this patent is extended or adjusted under 35 U.S.C. 154(b) by 192 days.

(21) Appl. No.: 12/305,932

(22) PCT Filed: Nov. 8, 2007

(86) PCT No.: PCT/EP2007/009697
§ 371 (c)(1),
(2), (4) Date: Dec. 19, 2008

(87) PCT Pub. No.: WO2008/055685
PCT Pub. Date: May 15, 2008

(65) Prior Publication Data
US 2010/0199604 A1    Aug. 12, 2010

(30) Foreign Application Priority Data
Nov. 9, 2006   (DE) .......................... 10 2006 053 193

(51) Int. Cl.
*B67C 7/00*   (2006.01)
*B65B 55/10*   (2006.01)
*B65B 55/04*   (2006.01)

(52) U.S. Cl. ................. 53/426; 53/452; 53/167; 53/561

(58) Field of Classification Search ................... 53/426, 53/452, 471, 167, 561, 282; *B67C 7/00; B65B 55/04, 55/10*
See application file for complete search history.

(56) References Cited

U.S. PATENT DOCUMENTS

| | | | | |
|---|---|---|---|---|
| 3,479,690 A | * | 11/1969 | Hagen | 425/163 |
| 3,512,996 A | * | 5/1970 | Roe, Jr. | 53/452 |
| 4,987,726 A | * | 1/1991 | Petho et al. | 53/425 |
| 5,996,322 A | * | 12/1999 | La Barre | 53/561 |
| 6,298,638 B1 | * | 10/2001 | Bettle | 53/452 |
| 6,596,231 B1 | * | 7/2003 | Catelli et al. | 422/28 |
| 2002/0159915 A1 | * | 10/2002 | Zelina et al. | 422/28 |
| 2009/0071104 A1 | * | 3/2009 | Fischer | 53/426 |

FOREIGN PATENT DOCUMENTS

| | | | |
|---|---|---|---|
| CH | 682816 A5 | * | 11/1993 |
| DE | 199 28 325 | | 12/2000 |
| DE | 10 2004 023 419 | | 12/2005 |
| DE | 10 2005 015 565 | | 10/2006 |
| EP | 531103 A2 | * | 3/1993 |
| EP | 1849746 A1 | * | 10/2007 |

(Continued)

OTHER PUBLICATIONS

Machine translation of DE 102004023419, retrieve from EPO website on Aug. 24, 2010, 5 pages.*

(Continued)

*Primary Examiner* — Stephen F Gerrity
(74) *Attorney, Agent, or Firm* — Hayes Soloway P.C.

(57) ABSTRACT

The invention relates to a device and a method for producing containers, such as e.g. bottles, in which different types of bottles are produced. Alternative treatment methods are used depending on the type of bottle to be produced. For example, a cooling treatment is carried out when producing bottles for carbonated beverages and a sterilisation treatment is carried out when producing bottles for non-carbonated beverages.

34 Claims, 4 Drawing Sheets

FOREIGN PATENT DOCUMENTS

| | | | | |
|---|---|---|---|---|
| JP | 02004692 | A | * | 1/1990 |
| JP | 03029792 | A | * | 2/1991 |
| JP | 03289423 | A | * | 12/1991 |
| JP | 08164925 | A | * | 6/1996 |
| JP | 2002096807 | A | * | 4/2002 |
| JP | 2006111295 | A | * | 4/2006 |
| JP | 2006193180 | A | * | 7/2006 |
| WO | WO 03068663 | A1 | * | 8/2003 |
| WO | WO 2006097243 | A2 | * | 9/2006 |
| WO | WO 2006128884 | A2 | * | 12/2006 |

OTHER PUBLICATIONS

Machine translation of DE 19928325, retrieved from EPO website on Aug. 24, 2010, 3 pages.*

International Search Report, dated Jan. 22, 2008, for PCT/EP2007/009697.

* cited by examiner

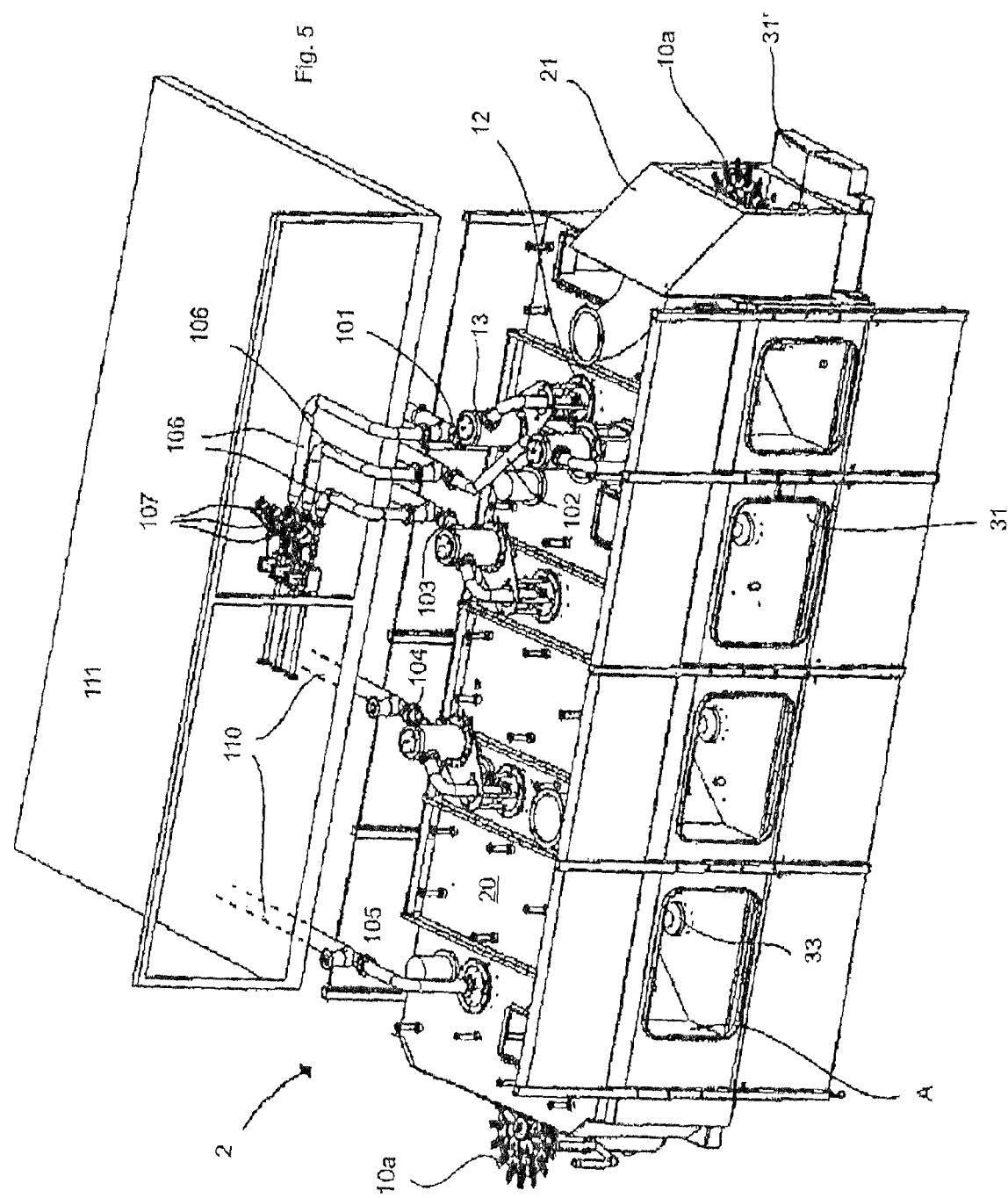

DEVICE AND METHOD FOR THE PRODUCTION OF PLASTIC CONTAINERS

FIELD OF THE INVENTION

The invention relates to a device and a method for producing plastic containers. The device for producing plastic containers is preferably a machine from the pharmaceutical or food technology sector. Such machines and methods are used mainly for the production and pre-treatment of containers, such as bottles, cans, stand-up pouches or vials. Containers made from plastic, in particular from PET, are preferably produced, treated, filled and closed.

BACKGROUND OF THE INVENTION

Such machines for producing, treating and filling containers are widely known from the prior art. For example, WO 2006 00 3304 A1 discloses a machine for producing and filling PET bottles, wherein the containers are treated by cooling the bottom thereof between the production process and the filling process. EP 1 572 540 B1 discloses a device and a method for sterilizing containers, wherein the sterilization depends on certain environmental parameters.

Such machines for sterilizing packagings are of a relatively complex design. This complex design has the disadvantage that such machines are not very flexible with regard to the containers to be produced. Therefore, while it is relatively easy for a container production machine, such as e.g. for a stretch-blowing machine, to be adjusted to different types of container to be produced, it is much more difficult for the treatment unit to react in a flexible manner to different container requirements. One disadvantage of the prior art is that different installations are required for containers for different foodstuffs, such as e.g. bottles for carbonated beverages and bottles for non-carbonated beverages. This is very expensive and very complicated.

SUMMARY OF THE INVENTION

The object of the present invention is therefore to provide a method and a device by means of which containers with different requirements can be produced in a simple and flexible manner.

The device for producing plastic containers is preferably an installation for producing, treating and filling the containers. The containers are preferably made from plastic, in particular from PET. They are preferably produced from preforms made from plastic, which are heated in a first step and then in a second step are formed by means of a blowing process, in particular a stretch-blowing process, to form the desired containers. The container treatment station is preferably a device through which the containers are transported on their way from the container production machine to the filling machine. The transporting of the containers through this device may take place in various ways; for example, transport on a conveyor belt or in a transport chain is conceivable, which holds the containers at the container bottom or in the region of the container body and/or container neck. According to one preferred embodiment of the invention, the containers are transported through the container treatment station by means of star wheels. The star wheels may grip the containers at various points; transport or gripping in the region of a carrier ring is preferably possible. This has the advantage that the containers are guided through the container treatment station at a fixed distance from one another, so that the upstream and downstream machines can be driven synchronously with one another. One advantageous mode of operating this installation is the block mode.

The container treatment station preferably comprises a plurality of treatment units, in the region of which a treatment can take place. The units can be selectively activated or deactivated by a control system. Corresponding activation or deactivation of the individual units takes place as a function of the containers to be produced. For example, if containers for carbonated beverages are to be produced, these will have different requirements with regard to their properties than containers for non-carbonated beverages. In order to be able to set these different mechanical and/or optical properties of the containers, a different treatment is required following the production of the containers in the blowing machine. Such a difference in the treatment may be, for example, the rapid cooling of the container bottom after production of the container.

Preferably, the container treatment station comprises, as different types of units, cooling and/or heating and/or sterilization and/or cleaning and/or decorating units. Other types of units are also conceivable in order to ensure a production of containers that is as flexible as possible. The decorating units are for example labelling units. In the sterilization unit, the treatment is preferably carried out using sterilization media in liquid or vapour form.

Since, according to one preferred further development of the invention, a sterilization of the containers produced is to be possible, it is advantageous that at least part of the container treatment station forms a chamber which is closed off from the ambient conditions. Preferably, the entire container treatment station is designed as a clean room.

The treatment station may be of various types. For example, it is possible both that the treatment units remain stationary and the containers are moved through the units during transport, and that the units move and have the same path at least during part of the movement of the containers through the container treatment station. Furthermore, it is conceivable that the units are arranged in such a way as to produce closed treatment chambers in the container treatment station, in which certain processes take place. For instance, it is possible that spray nozzles for sterilization media are arranged in the wall of the container treatment station and/or of a unit, which nozzles cover a certain area and thus spray containers at certain locations as they are transported. However, it is also conceivable that smaller closed units are formed, so that e.g. treatment tunnels are formed. These may be completely or partially closed off from the surroundings, i.e. from the container treatment station.

In the case of containers to be treated which have an opening only at one end, the star wheels themselves may also be designed as treatment stations. One preferred further development of the invention consists in that in each case at least one nozzle is arranged in the transport star wheels above the mouth of the containers to be transported and treated, which nozzle can introduce treatment media into the containers. Via such nozzles, hydrogen peroxide or peracetic acid can be introduced as sterilization media into the containers. These nozzles arranged above the mouths are preferably designed in such a way that they rotate in the region of the respective transport star wheel in a manner fixedly assigned to the containers. Preferably, they are arranged in a height-adjustable manner so that the nozzle or at least a part thereof protrudes at least partially into the container during the introduction of treatment medium. This arrangement has the advantage that the treatment medium can be metered very precisely in terms of both the consumption and the location to be treated.

Preferably, the device has for each treatment unit a stationary distributor which may be arranged either inside or outside the housing of the container treatment station. The distributor is connected on the one hand to a treatment medium supply and on the other hand to the treatment units. Since the distributor preferably has a stationary part and a rotating part, a direct coupling both to the stationary treatment medium supply and to the rotating transport star wheels is possible. Arranged in the region of the distributor is at least one evaporator which can evaporate the liquid sterilization or cleaning medium.

The method for producing plastic containers comprises at least the steps of production of the containers, intermediate treatment and filling of the containers, wherein the intermediate treatment takes place temporally between the production process and the filling process. According to one preferred embodiment of the invention, a sterilization of the containers is carried out in at least one treatment unit, wherein an external and/or internal treatment takes place. An internal treatment of the container preferably takes place by introducing a sterilization medium directly into the bottle via the mouth thereof, since this results in a consumption of media that is as low and as targeted as possible. A droplet from a nozzle into the container is just as conceivable as a spraying of the sterilization medium. It is also possible to carry out an external treatment of the container, wherein here preferably at least one dedicated sterilization tunnel is provided. A sterilization tunnel has the advantage that the space around the container to be sterilised can be kept as small as possible, so that the consumption of sterilization medium is minimised.

A sterilization or cleaning may be carried out by a sterilization medium in liquid and/or gaseous and/or vapour form, wherein hydrogen peroxide is used as the preferred medium. This has the advantage that good sterilization can be achieved in low sterilization times. If liquid hydrogen peroxide is used, evaporators are preferably provided, by means of which it is possible for sterilization medium in vapour form to be introduced into the containers. The sterilization is preferably carried out at a point in time during the treatment method at which the containers still possess a residual heat. This residual heat allows a dry sterilization using sterilization medium in vapour form, without the latter condensing. The use of the residual heat is particularly advantageous since a dry sterilization is particularly desirable in order to facilitate the removal of residues of the sterilization medium. However, other sterilization media are also conceivable, In order to be able to make optimum use of the "non-condensation" of the sterilization medium in the container treatment station, it is possible that a temperature equalisation in the container wall is carried out by targeted cooling or heating in at least one treatment and/or transfer star wheel. To this end, relatively hot or cold air for example can be blown into the container or can be blown onto the outer wall thereof. As a result, the temperature distribution can be homogenised.

Instead of sterilization, it is also possible to carry out a cleaning and/or disinfection of the, containers using the method and device according to the invention. A cleaning and/or disinfection of the container outer wall may be carried out for example using sterile water.

According to one preferred further development of the invention, the transporting of the containers in the container treatment station takes place by means of transport star wheels, wherein the intermediate treatment preferably takes place during transport. Preferably, at least two different types of transport star wheels are located in the container treatment station, namely treatment star wheels on the one hand and transfer star wheels on the other hand. The transport star wheels may have identical or different diameters. Preferably, the treatment star wheels have a larger diameter than the transfer star wheels, and the main treatment steps take place there. Preferably, a sterilization of the interior of the containers takes place in the treatment star wheels and a sterilization of the container outer wall takes place in the transfer star wheels. The container cooling is preferably accommodated in the transfer star wheels, with such a treatment also being possible in the treatment star wheels.

Containers with different properties, preferably with different mechanical properties, can be produced using the method according to the invention. It is possible for example to produce containers for carbonated or non-carbonated beverages. Due to their different compositions and effects on the containers and also different sensitivity levels, different containers and/or different treatments during the production of the finished products are required. For example, containers with a stable bottom are required for the filling of carbonated beverages, since otherwise the container bottom may curve outward and the container may be unable to stand upright. For such a stable container, it is advantageous if the container bottom is cooled as soon as possible after production of the container. The cooling gives rise to a "freezing" of the molecular structure at the appropriate point in time, as a result of which an increased stability is achieved.

Such a stable packaging is not required for the filling of non-carbonated beverages; instead, the aim in this case is to introduce as few germs as possible into the bottle to be filled, in order to achieve a sufficient shelf life. A particularly clean or in some cases even sterile/low-germ filling of such beverages is therefore necessary. Therefore, when non-carbonated beverages are packaged according to the invention, only the units required for cleaning and/or sterilization are activated. The other units remain inactive, with transport but no treatment taking place.

BRIEF DESCRIPTION OF THE DRAWINGS

The method according to the invention and the device according to the invention will be explained in more detail with reference to the figures, in which:

FIG. 5 shows an isometric view of a container treatment station.

DETAILED DESCRIPTION

Figure 1:
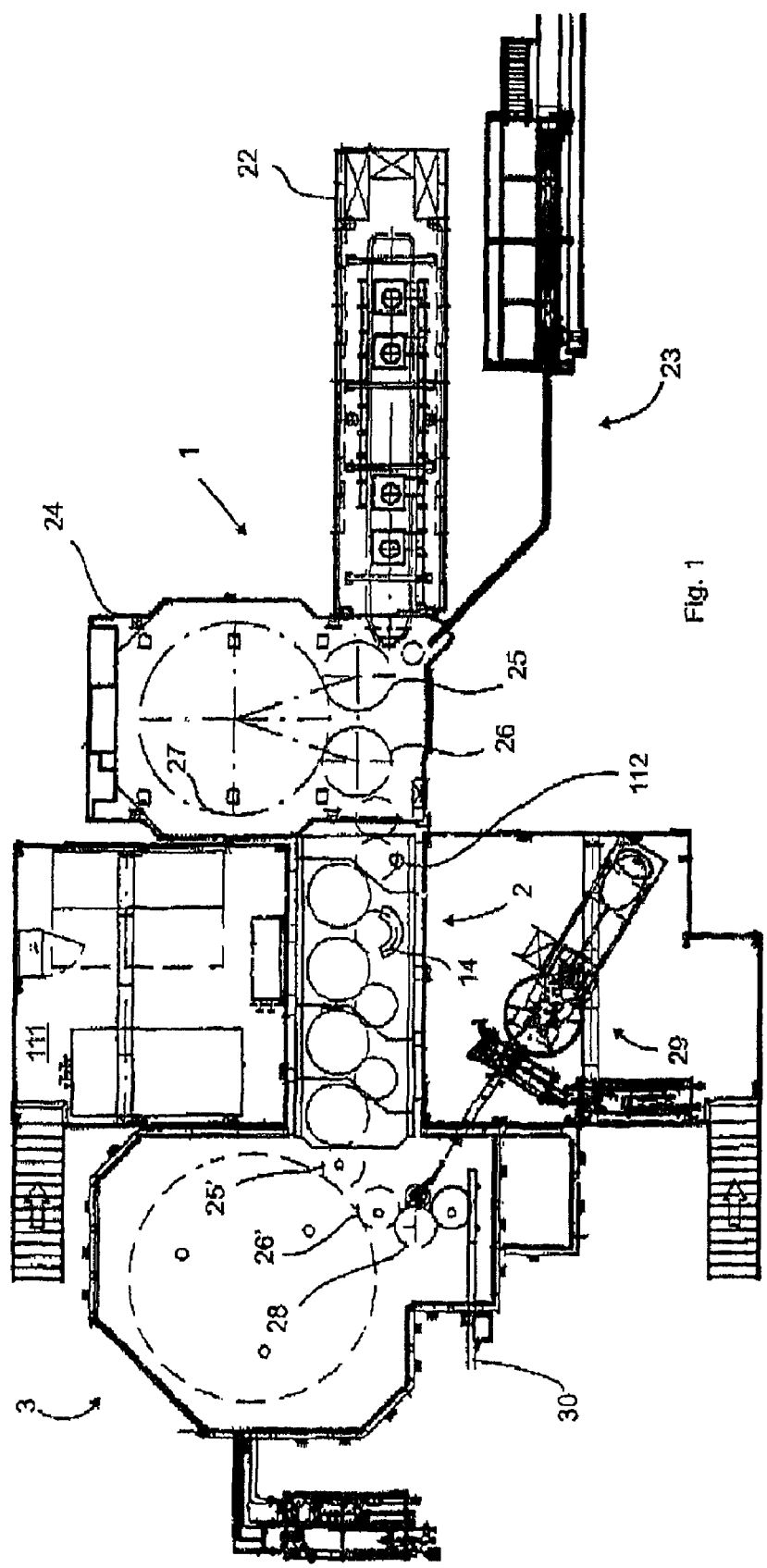
FIG. 1 shows a plan view of a device for producing plastic containers.

FIG. 1 shows a container production machine 1 which comprises a preform sorting and supply device 23, an oven 22 and also a stretch-blowing machine 24. The preforms are fed from a storage device (not shown here) to the preform sorting device 23 and are transported via a supply system to the oven 22, where they are brought to a certain orientation temperature. The oven 22 may be an infrared heating oven or a microwave oven. From the oven 22, the heated preforms are handed over via the inlet star wheel 25 to the blowing wheel 27. The blowing wheel has a plurality of blow moulds (not shown here), into which the preforms are blown by means of compressed air. The bottles which have then been blown are picked up by the outlet star wheel 26 and handed over to a hand-over star wheel 10*a* which closes the transfer gap between the outlet star wheel 26 and the first transfer star wheel 10 of the container treatment station 2. By way of example, the hand-over star wheel 10*a* may be used as a temperature equalisation star wheel in order to bring zones of different temperature in the interior of the bottle to an approximately uniform surface temperature. To this end, for example, temperature-controlled sterile air at a defined temperature may be blown by rotating nozzles through the mouth towards the container bottom, which then transfers heat from hotter zones to zones with a low temperature level.

Both the outlet star wheel 26 and the following star wheels, such as e.g. the hand-over star wheel 10*a*, the transfer star wheels 10 and the treatment star wheels 9 grip the bottles in each case in the mouth region. A closed transport of the blown bottles at the mouth of the bottles is thus ensured at least from the outlet star wheel 26 to the outlet of the container treatment station 2. Within the container treatment station 2, the containers 50 are transported through the treatment units in a manner suspended from the mouth region. From the outlet of the container treatment station 2, the treated containers 50 are handed over to the container filling machine 3 and a filling process is carried out. After this filling process, the containers are closed in a closing device 28, wherein the closing device 28 is supplied with cleaned, disinfected or sterilised closures from the closure disinfection device 29. The closure disinfection device 29 is a module for disinfecting closures by means of hydrogen peroxide, wherein other disinfection methods, such as e.g. by means of liquid peracetic acid, are also conceivable.

After the containers have been closed, said containers are handed over to a container onward transport device 30, which may comprise either a conveyor belt or a neck handling system.

Figure 2:
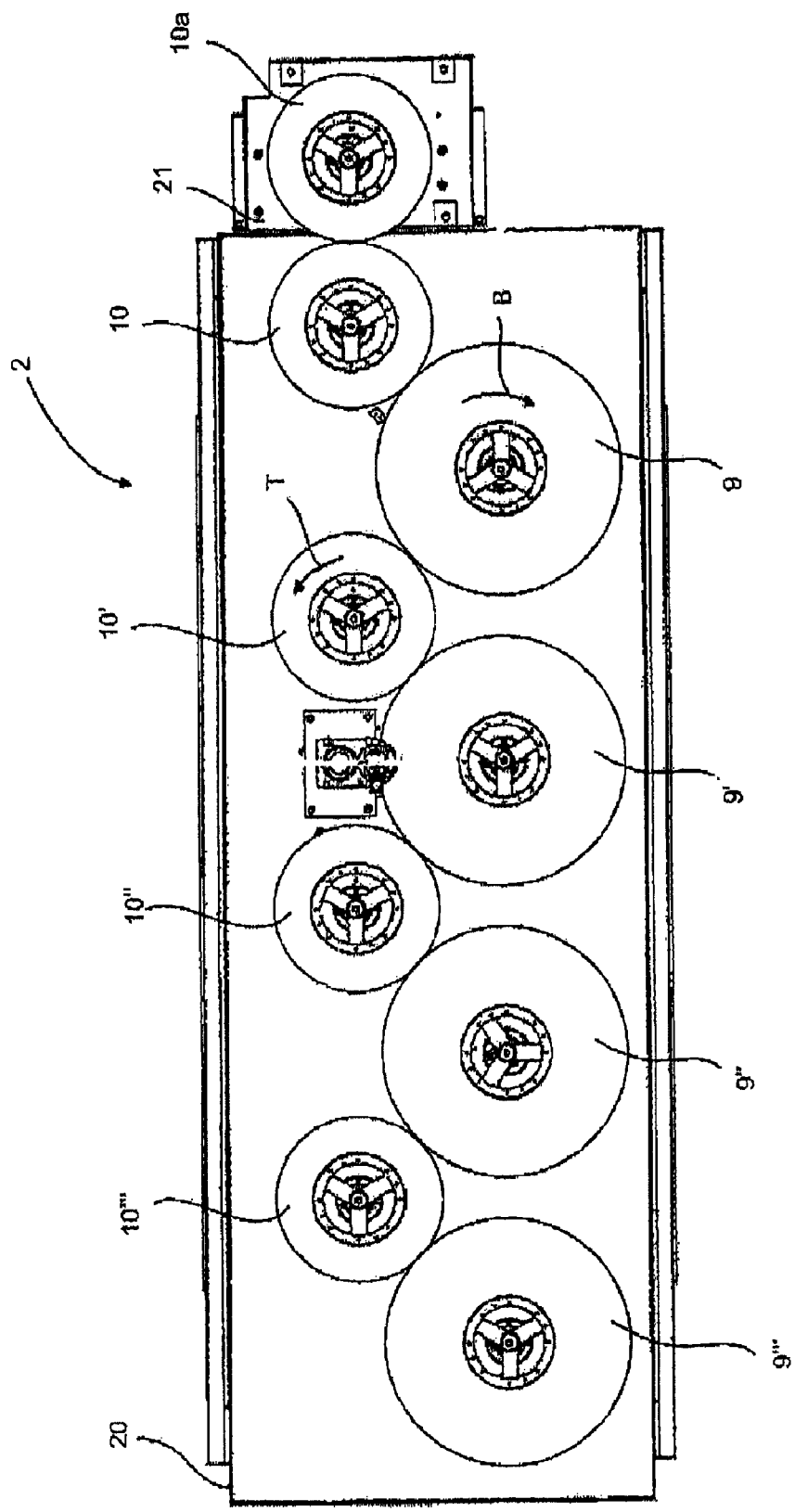
FIG. 2 shows a plan view of a container treatment station.

FIG. 2 shows a plan view of the container treatment station 2, which is connected via a hand-over star wheel 10*a* to the container production machine 1.

The entire container treatment station 2 is accommodated in a housing 20, so that the atmosphere within the container treatment station 2 can be substantially closed off from the atmosphere outside. It is therefore possible to establish defined ambient conditions within the container treatment station 2.

The hand-over star wheel 10*a*, which is accommodated in an airlock 21, is located upstream of the container treatment station 2 in the transport direction so that it is possible to transfer the produced containers from the container production machine 1 to the container treatment station 2.

The container treatment station 2 itself has a plurality of transport star wheels 8, of which four are designed as treatment star wheels 9, 9', 9", 9''' and four are designed as transfer star wheels 10, 10', 10", 10'''. The containers 50 always run through all the transport star wheels 8 during their treatment in the container treatment station 2, even if a treatment is provided only in certain treatment or transfer star wheels 9, 10. At the end of the container treatment station 2, the containers 50 are handed over by an inlet star wheel 25' to the container filling machine 3.

Figure 3:
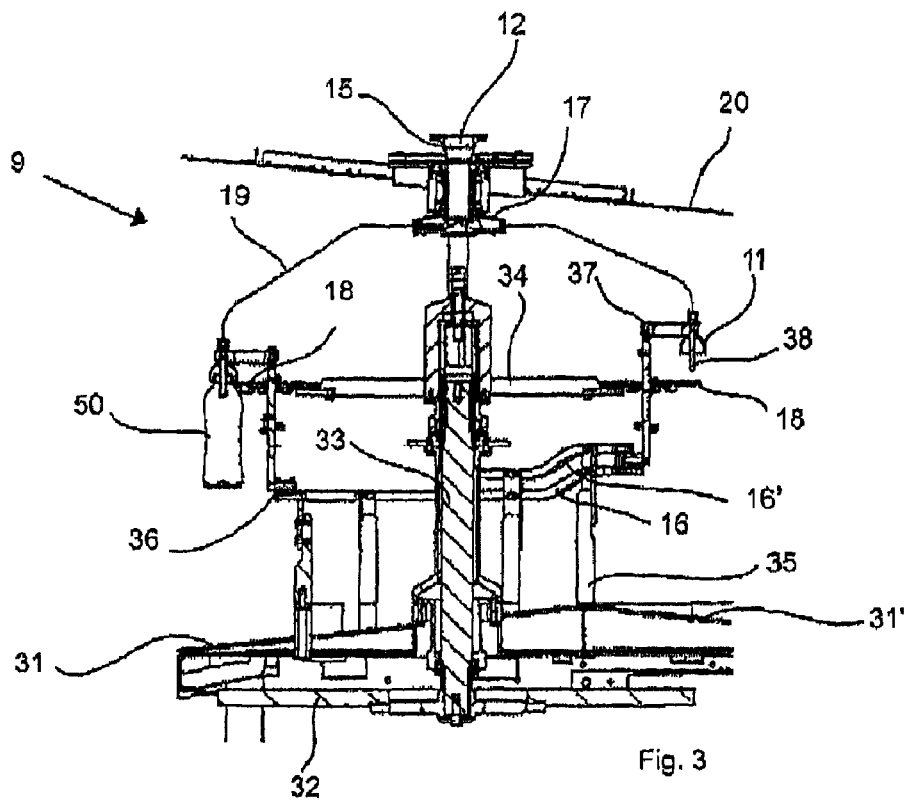
FIG. 3 shows a section through a treatment unit.

FIG. 3 shows a cross section through the treatment star wheel 9. The treatment star wheel 9 comprises a central star wheel column 33 which is secured in a carrier plate 32. The carrier plate 32 forms part of the basic machine frame of the container treatment station 2 and is located in the external atmosphere, i.e. not in the treatment area. The delimitation of the treatment area as seen from the bottom up starts with the table surfaces 31 and 31'. These are preferably at an angle with respect to one another, so that there is a downward gradient towards the outer edge of the container treatment station 2 in order to be better able to transport away any liquids and dirt. The star wheel column 33 has tangential supports 34 which can move in the direction of rotation B. Attached to the end of the tangential supports 34 are neck grippers 18 which grip the containers 50 below or above the carrier ring in the region of their mouth.

Arranged in the table surfaces 31 and 31' are cam holders 35, at the upper ends of which two control cams 16, 16' are arranged. Control rollers 36 run between the lower control cam 16 and the upper control cam 16', which control rollers are connected to nozzle holders 37. In each case a tangential support 34 with an associated neck gripper 18 is fixedly assigned, relative to the rotary position, a nozzle holder 37 with an attached control roller 36 and a rotating nozzle 11. A height movement of the rotating nozzles 11 relative to the container 50 results on account of the control cam 16, 16' and the control roller 36.

The rotating nozzles 11 are designed in a bell shape so that they have a diameter larger than the mouth diameter of the containers 50 to be treated. In this way, the rotating nozzles 11 can be placed over the mouth of the containers 50. The rotating nozzles 11 have an application tube 38, by means of which treatment media (e.g. sterile air, hydrogen peroxide) can be introduced into the containers 50, and they are equipped at the top with connecting lines 19 which lead to a distributor 12. When a treatment medium is introduced via the application tube 38 into the containers 50, firstly the container interior is filled with the treatment medium. If more treatment medium is fed into the containers 50 than their volume accommodates, an overflowing of the containers 50 with treatment medium results on account of the bell-shaped design of the rotating nozzles 11, so that at the same time an external disinfection/external cleaning takes place.

The distributor 12 forms the connection piece between the star wheel column 33 and the housing 20 of the container treatment station 2. The distributor 12 has a stationary part 15 and a rotating part 17. Treatment medium is supplied to the container treatment station 2 through the stationary part 15. As already mentioned above, the rotating part 17 is connected via flexible connection lines 19 to the rotating nozzles 11, so that the treatment medium can pass from the distributor 12 via the connection lines 19 and the rotating nozzles 11 into the containers 50.

Figure 4:
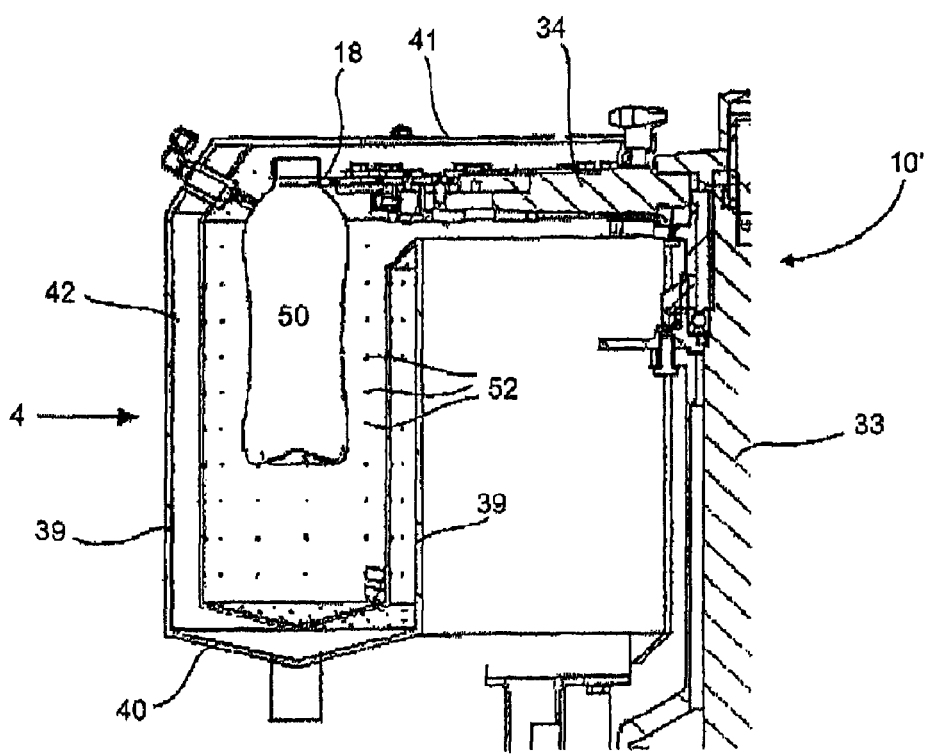
FIG. 4 shows a section through another treatment unit.

FIG. 4 shows a further treatment unit of the container treatment station 2, namely a sterilization unit, in particular a sterilization tunnel 14 which is arranged around the transfer star wheel 10' over part of its circumference so that the containers 50, during transport along the transfer star wheel 10', are at least partially located in an atmosphere that can be substantially closed off from the surroundings. The transfer star wheel 10' also has a star wheel column 33 with tangential supports 34 attached thereto and neck grippers 18 attached at the end of the latter. The neck gripper 18 grips the container 50 below or above the carrier ring in the region of the mouth. The sterilization tunnel 14 has perpendicular side walls 39 and also a bottom wall 40 and a top wall 41. The bottom wall 40 is arranged in a V-shaped manner, so that there is a downward gradient from the side walls 39 to the centre of the bottom wall 40. The side walls 39 and the bottom wall 40 enclose an intermediate space 42, in which a treatment medium is located. The treatment medium can pass through the openings 52 from the intermediate space 42 into the interior of the sterilization tunnel 14, where the container 50 is located. In this way, a uniform treatment of the container 50 over its entire surface is possible. Preferably, a sterilizing/disinfecting/cleaning treatment of the exterior of the container 50 is carried out by the sterilization tunnel 14. Such a treatment medium of the sterilization tunnel 14 may be e.g. hydrogen peroxide.

FIG. 5 shows a container treatment station 2 in an isometric view, wherein the containers 50 are transported from the right-hand half of the figure to the left-hand half of the figure. The containers 50 are again transported via a container production machine 1 (not shown here) and the hand-over star wheel 10a through the airlock 21 into the container treatment station 2. Each treatment star wheel 9, 9', 9", 9'" and the transfer star wheel 10' is assigned a media supply. For instance, a media supply 101 is assigned to the treatment star wheel 9 and its distributor 12. A media supply 102 is assigned to the transfer star wheel 10', a media supply 103 is assigned to the treatment star wheel 9', a media supply 104 is assigned to the treatment star wheel 9" and a media supply 105 is assigned to the treatment star wheel 9'". The media supplies 101, 102, 103 and 104 also have an evaporator 13 in each case. The media supplies 101 to 105 in each case open into the distributors 12 assigned to the transport star wheels 8.

The media supplies 101, 102 and 103 additionally have lines 106, through which hydrogen peroxide can be metered upstream of the respective evaporators 13. Through the media supplies 101 to 103, sterile air is mixed with hydrogen peroxide by opening the valves 107, so as to provide a sterilizing treatment medium in vapour form which is mixed with air. If the valves are not opened, only a treatment with sterile air takes place.

The container treatment station 2 is designed in such a way that a treatment with hydrogen peroxide can be carried out in the treatment star wheels 9, 9' and in the transfer star wheel 10' and a rinsing with sterile air can be carried out in the treatment star wheels 9" and 9'". In the transfer star wheel 10, a cooling treatment by a nitrogen nozzle 112 can take place by introducing liquid nitrogen into the containers 50. A double-headed nozzle is preferably located in the transfer star wheel 10, so that in each case two containers 50 can be supplied with nitrogen in an alternating manner or simultaneously. In this case, only every second container in each case is supplied with nitrogen by a nitrogen nozzle 112.

The sterilization and cooling treatments preferably take place on an alternative basis. If a container is cooled by means of liquid nitrogen in the transfer star wheel 10 after it has been produced, the treatment star wheels 9 and 9' are supplied not with hydrogen peroxide but rather only with sterile air. As a result, although a rinsing of the containers 50 with sterile air takes place, no sterilization with hydrogen peroxide is carried out. On the contrary, in the event of a sterilization of the containers by supplying hydrogen peroxide in the treatment star wheels 9 and 9', no cooling is carried out by supplying liquid nitrogen in the transfer star wheel 10. The treatment star wheel 9'" has just one air supply 110, so that always only rinsing with air is carried out here in all the alternative treatment methods. Depending on the treatment method, the other treatment star wheels 9, 9' and 9" can be used either for sterilization or only for rinsing, depending on which treatment variant is required in each case.

The supply device for the hydrogen peroxide is located on a pedestal 111. This has the advantage that the periphery for providing the hydrogen peroxide is easily accessible for repair or maintenance tasks.

The invention claimed is:

1. A device for producing plastic containers, wherein the device comprises at least one container production machine, a container treatment station and a container filling machine, wherein an outlet of the container production machine is actively connected to an inlet of the container treatment station and an outlet of the container treatment station is actively connected to an inlet of the container filling machine, and wherein the container treatment station comprises a plurality of treatment units, wherein at least two treatment units are provided for different types of plastic containers, wherein different treatments can be carried out depending on the type of container, characterized by a control system for activation of or deactivation of the treatment units, depending on whether the containers are being produced for carbonated beverages or for non-carbonated beverages.

2. The device according to claim 1, wherein the treatment units are cooling units and/or sterilisation units and/or decorating units.

3. The device according to claim 2, wherein the container treatment station has a cooling tunnel as a further cooling unit.

4. The device according to claim 1, wherein the treatment units are located at least partially in a chamber which is closed off from the ambient conditions.

5. The device according to claim 1, wherein the container treatment station forms a chamber which is substantially closed off from the ambient conditions.

6. The device according to claim 1, wherein the container treatment station comprises a plurality of transport star wheels.

7. The device according to claim 1, wherein the container treatment station comprises a plurality of treatment star wheels and also a plurality of transfer star wheels which securely transport the containers in the mouth region.

8. The device according to claim 7, wherein the treatment star wheels are assigned nozzles which rotate therewith and through which a treatment medium can be introduced into the containers.

9. The device according to claim 8, wherein the treatment star wheels and/or the nozzles are arranged in a height-adjustable manner so that the relative distances thereof with respect to one another can be varied.

10. The device according to claim 9, wherein the nozzles are connected to a distributor which has a rotating part and a stationary part, wherein the stationary part of the distributor is connected to an evaporator.

11. The device according to claim 8, wherein the nozzles are connected to a distributor which has a rotating part and a stationary part, wherein the stationary part of the distributor is connected to an evaporator.

12. The device according to claim 1, wherein the container treatment station comprises at least one cooling unit for the internal and/or external treatment of the containers.

13. The device according to claim 12, wherein the cooling unit operable with liquid nitrogen.

14. The device according to claim 13, wherein the container treatment station is equipped with at least two cooling units.

15. The device according to claim 12, wherein the container treatment station is equipped with at least two cooling units.

16. The device according to claim 1, wherein airlocks are provided at the inlet of the container treatment station and at the outlet of the container treatment station.

17. The device according to claim 1, wherein the container production machine, the container treatment station and the container filling machine are configured to be driven synchronously.

18. The device according to claim 1, wherein the control system is configured to activate or deactivate at least one of said treatment units, depending on the type of container being produced.

19. A method for producing plastic containers, comprising the steps of producing the containers in a container production machine; treating the containers in a container treatment station; and filling of the containers in a container filling machine, wherein the step of treating the containers takes place temporally between the production step and the filling step and may include different treatments, wherein plastic containers with different mechanical properties can be produced, characterized in that at least two treatment units of the container treatment station, which execute different treatments of the containers and which are activated or deactivated by a control system, depending on whether the containers are being produced for carbonated beverages or for non-carbonated beverages.

20. The method according to claim 19, wherein sterilisation of the container interior by a sterilisation medium is carried out in the container treatment station.

21. The method according to claim 20, wherein sterilisation of at least part of the container outer wall by a sterilisation medium is carried out in the container treatment station.

22. A method according to claim 20, wherein a sterilisation medium in liquid and/or gas and/or vapour form is used during the sterilisation.

23. The method according to claim 20, wherein the sterilisation in the container interior is carried out using hydrogen peroxide in vapour form.

24. The method according to claim 20, wherein a cleaning of the container outer wall is carried out using sterile water.

25. The method according to claim 19, wherein sterilisation of at least part of the container outer wall by a sterilisation medium is carried out in the container treatment station.

26. A method according to claim 25, wherein a sterilisation medium in liquid and/or gas and/or vapour form is used during the sterilisation.

27. The method according to claim 19, wherein the containers to be produced are transported between the container production machine and the container filling machine by means of transport star wheels in the container treatment station, wherein the treatment in the container treatment station takes place while the containers are being transported.

28. The method according to claim 19, wherein the sterilisation of the container interior takes place in treatment star wheels and a sterilisation of the container outer wall takes place in transfer star wheels.

29. The method according to claim 19, wherein the containers are held by at least two treatment star wheels and at least one transfer star wheel during transport through the container treatment station.

30. The method according to claim 19, wherein the container treatment station comprises at least four treatment star wheels and three transfer star wheels, wherein a treatment with hydrogen peroxide and a rinsing with sterile air takes place in the treatment star wheels, and wherein no treatment or a sterilisation of the container outer wall takes place in the transfer star wheels.

31. The method according to claim 19, wherein the containers to be treated still possess a residual heat as they enter the container treatment station, which allows an immediate dry sterilisation using sterilisation media in vapour form without condensation thereof.

32. The method according to claim 19, wherein liquid nitrogen is introduced into the containers in order to cool the bottom, wherein the introduction of nitrogen takes place while the container is located in a hand-over star wheel, a transfer star wheel or a treatment star wheel.

33. The method according to claim 19, wherein treatment units for cooling are active when producing containers for carbonated beverages and treatment units for sterilisation are active when producing containers for non-carbonated beverages.

34. The method according to claim 19, wherein the control system selectively activates or deactivates at least one of said treatment units, depending on the type of container being produced.

* * * * *

UNITED STATES PATENT AND TRADEMARK OFFICE
CERTIFICATE OF CORRECTION

| | |
|---|---|
| PATENT NO. | : 7,900,422 B2 |
| APPLICATION NO. | : 12/305932 |
| DATED | : March 8, 2011 |
| INVENTOR(S) | : Fischer |

It is certified that error appears in the above-identified patent and that said Letters Patent is hereby corrected as shown below:

Claim 13, Col. 8, line 47 "the cooling unit operable" should be --the cooling unit is operable--.

Signed and Sealed this
Eighteenth Day of December, 2012

David J. Kappos
*Director of the United States Patent and Trademark Office*